United States Patent Office 2,910,387
Patented Oct. 27, 1959

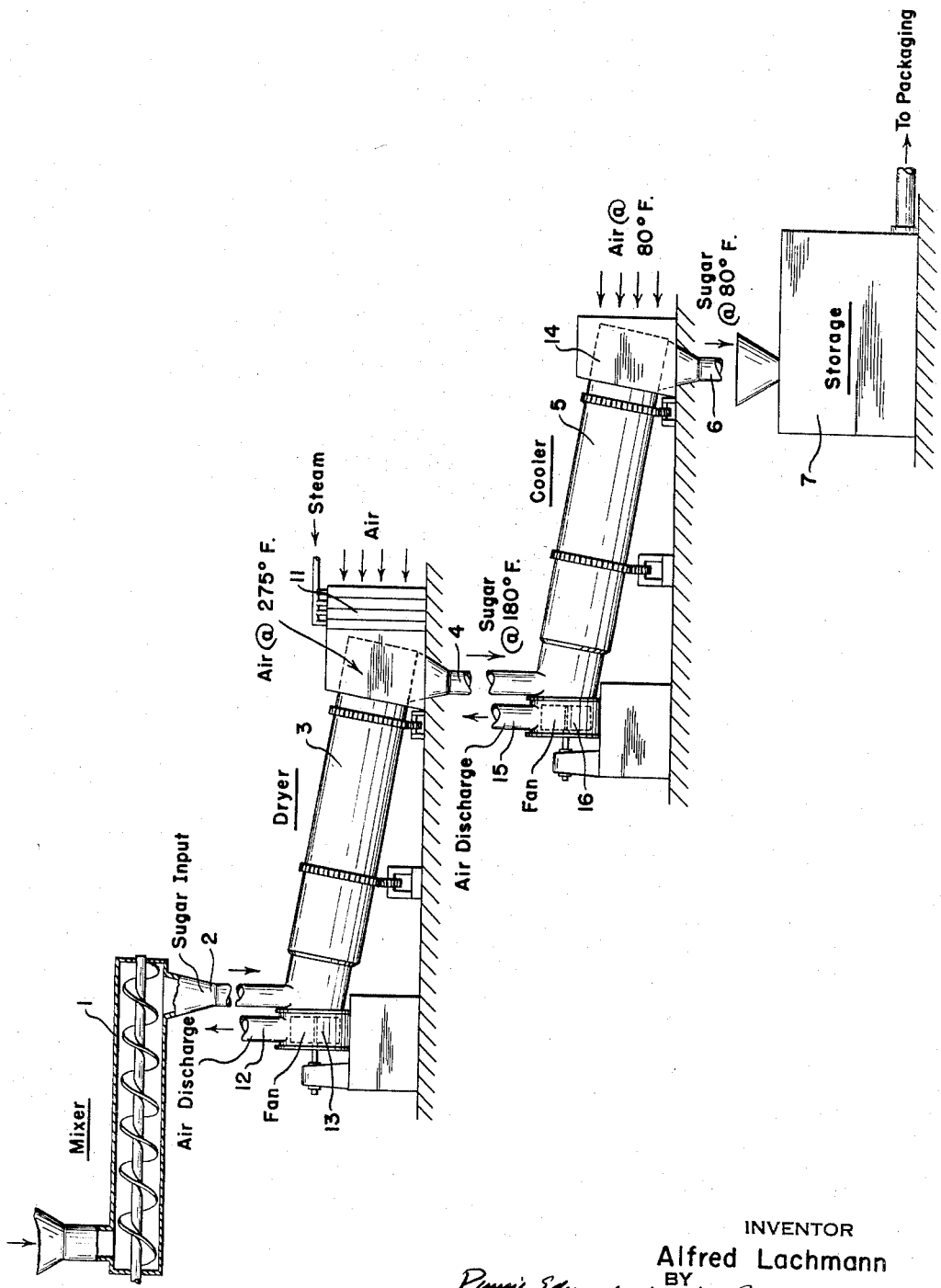

2,910,387

BROWN SUGAR

Alfred Lachmann, Haddonfield, N.J., assignor to The American Sugar Refining Company, New York, N.Y., a corporation of New Jersey Application March 13, 1956, Serial No. 571,260

3 Claims. (Cl. 127—30)

This invention relates to an improved free-flowing, non-caking brown sugar product in granular form, and includes the new product and the method of producing it.

The improved granular brown sugar product of the present invention is a specially dried granular brown sugar in which the sticky molasses coating has been converted into a dry, solid film or layer, non-sticky and brittle in character, the dried granular product having a low moisture content and with unusual resistance to caking.

Commercial brown sugars are commonly marketed in a moist form. The handling of such sugars presents a number of problems to the industrial user as well as to the consumer. They are usually packaged in cartons or bags which are provided with moistureproof linings. As long as the bag or carton is closed, the brown sugar keeps its smooth texture. When a carton of brown sugar is opened and exposed to the air at room temperature, the sugar has a tendency to lose some of its moisture under certain climatic conditions, and during this drying out period, the brown sugar tends to cake and to harden. The hard lumps formed are difficult to disintegrate and present a number of handling and mixing problems to the industrial user and to the consumer.

Brown sugar contains, in addition to pure sucrose as its principal constituent, a coating of molasses which imparts the distinctive flavor and color to this type of sugar. The molasses, which is composed of sucrose, invert sugar, ash, water and other crystallizable and non-crystallizable compounds, surrounds the pure sucrose crystals in the form of a thin and sticky film. When brown sugar loses part of its moisture, by drying under certain atmospheric conditions, the thin film of molasses surrounding the sugar crystals increases in stickiness and cements the adjacent crystals together, thus forming a hard lump.

I have found that the formation of such hard lumps difficult to disintegrate can be avoided and an improved dry granular brown sugar product produced, having valuable free-flowing and non-caking properties, by subjecting ordinary granular brown sugar with its normal molasses content to drying at an elevated temperature under conditions where the granular nature of the product is retained and advantageously with agitation during the drying operation, until a dried product is obtained containing only a fraction of a percent of moisture, and then cooling the hot dried product to give directly a granular product which is entirely free from the stickiness of the original brown sugar and which has the molasses component of the original sugar converted into a hard, solid, non-tacky film or layer.

Whereas the raw brown sugar cannot be pulverized, the improved dried granular brown sugar can advantageously be pulverized to form a valuable pulverulent sugar product.

The improved process of the present invention enables an improved free-flowing and non-caking granular brown sugar product to be obtained without the use of coating materials for coating the brown sugar before, during or after drying.

The time of drying can be varied, depending upon the elevated temperature employed, but the drying should be continued until the granular brown sugar has a moisture content of around 1% or less and advantageously less than ½%. The hotter the drying temperature to which the sugar is subjected, the faster will be the drying rate, and dried products of low moisture content can be readily obtained. The keeping quality increases with the decreased moisture content of the brown sugar, and particularly valuable products are produced with a moisture content of only a small fraction of 1%.

I have found that continuous agitation of the brown sugar while drying at an elevated temperature is advantageous in giving an improved granular brown sugar product. This continuous agitation of the granular brown sugar during drying can be accomplished in different types of apparatus providing for agitation, such as a Hobart mixer or a rotary drum type of granulator and dryer. This agitation of the granular sugar while drying causes the sugar particles or granules or clusters to rub against each other. Sugar particles with sharp angles tend to have their sharp angles broken off and to give rounded particles or rounded clusters or aggregates. The smaller particles or powdery material which may thus be broken off from the sugar particles during the agitation, and while the brown sugar is still wet and hot, stick to the fine film of molasses coating the brown sugar cluster or become part of the aggregates or clusters.

Moreover, the continued agitation of the granular brown sugar during drying tends to rub off the molasses layer or cause its rearrangement and flow, apparently giving exposed particles with less molasses coating them and even with pure sucrose crystals exposed, while forcing the hot, plastic molasses, as it is dried with continued agitation, into the spaces between the sucrose crystals, to give what appear to be denser and rounded clusters or aggregates resulting from the attrition and agitation.

The granular brown sugar which is used in the present process may contain its normal moisture content or may be subjected to a preliminary and partial drying to reduce the water content of the molasses layer, e.g., to around 1.5% to 2%. This preliminary drying is not, however, necessary, and ordinary granular brown sugar with its normal moisture content can advantageously be used in the present process.

The drying of the granular sugar with agitation is advantageously carried out by drying with hot air in a suitable agitation apparatus. Drying and agitating equipment such as a Hersey granulator can thus be used, and it is one advantage of the present process that the drying of the granular brown sugar can be carried out in available drying and agitation equipment. When hot air is thus used for drying the brown sugar with continued agitation, the hot air comes in contact with the surfaces of the particles and granules or aggregates as they are being subjected to agitation and to the rubbing and compacting treatment which accompanies such agitation.

When the granular brown sugar is thus dried by the use of hot air at elevated temperature, it is important to cool the dried product to about room temperature before discharging it from the apparatus. The temperature of the dry, granular product leaving the drying apparatus should not exceed about 85° to 90° F.

The proper drying time will depend upon the construction and type of the drying apparatus used, the air temperature at which the product is dried, the rate of air passage through the drying equipment, and the feed of the raw material. The moisture level to which the product should be dried to make it free-flowing will vary somewhat with the different grades of brown sugar, but it should be a relatively low moisture content and, in general, the lower the moisture level, the greater the resistance of the product to fluctuating atmospheric conditions.

The moisture content of the dried product is not, however, the sole criterion, since it is important to carry out the drying process under conditions where the product is obtained in a granular state and with the original molasses coating converted by the drying operation to a film or layer which is hard and solid when cold and which is non-sticky and brittle in nature. The moisture content of a satisfactory product will, in general, be less than 1% and advantageously a small fraction of 1%, although improved results have been obtained in some cases with somewhat larger percentages of moisture in the final product.

An outstanding characteristic of the new dried granular product is its remarkable resistance to caking, which enables the product to be maintained under ordinary conditions for relatively long periods of time as compared with ordinary granular brown sugar.

In order to evaluate the caking resistance or resistance to moisture of the dried brown granular sugar product under controlled conditions, the following method was adopted for testing the caking resistance or resistance to moisture of the product.

The method was an accelerated method consisting in exposing 10 grams of the product to be tested in an open aluminum dish to a temperature of 85° F. and a relative humidity of 70%. The sample is slightly tilted during the experiment, in order to test its resistance toward flow.

When the product starts to lose its free-flowing characteristics, which is observed by tilting the dish back and forth, the time of resistance to caking is recorded.

These conditions represent adverse atmospheric conditions and, if the product is free-flowing under these extremely unfavorable conditions for a long period of time, it is assumed that it will resist caking under normal fluctuating atmospheric conditions.

In general, the caking resistance of the dried, granular brown sugar product should be around 30 minutes or more by the above tests.

After the drying operation is completed, the resulting product is advantageously screened to remove small amounts of oversize, e.g., by passage through a 10-mesh screen. In some cases, a further screening to remove fine particles, e.g., passing through a 35 or 48-mesh screen, may also be desirable.

The invention will be further described in connection with the following examples, but it will be understood that the invention is not limited thereto.

*Example 1.*—The brown sugar used had the following analysis:

| | Percent |
|---|---|
| Sugar (polarization) | 88.7 |
| Invert | 3.87 |
| Ash | 2.13 |
| Moisture | 2.77 |
| Undetermined | 2.53 |

This brown sugar was predried to 2.08% moisture content and kept in a closed vessel until used in carrying out the process in the laboratory apparatus.

The drying apparatus used was a small, laboratory, rotary type dryer in which the predried brown sugar was subjected to agitation by rotation of the drum and with passage of hot air through the rotary dryer during the agitation and drying. Using air at a temperature of 130° C. for drying the granular sugar and with continuation of the agitation and drying for a period of 60 minutes, a product was obtained having a moisture content of 0.54% and a moisture resistance by the above test of 30 minutes; while, by continuing the drying for 120 minutes, a product of 0.50 moisture content was produced, having a moisture resistance by the above tests of 35 minutes. These tests were carried out by screening the dried product through a 10-mesh screen to remove oversize.

*Example 2.*—The apparatus used was a Hobart mixer in which the predried brown sugar of Example 1 was placed and subjected to continuous mixing at different temperatures and for different periods of time. A stainless steel bowl was heated by means of a heating mantle to the desired temperature. The product was cooled to room temperature, screened through a No. 10 Tyler screen and evaluated by the tests previously described. The results of a series of tests is indicated in the following table:

| Drying temp., ° C. | Drying time (min.) | Moisture content | | Moisture resistance (min.) |
|---|---|---|---|---|
| | | Raw material, percent | End product, percent | |
| 60 | 60 | 2.08 | 0.67 | 50 |
| 110 | 60 | 2.08 | 0.53 | 57 |
| 110 | 60 | 2.08 | 0.45 | 60 |
| 110 | 120 | 2.08 | 0.45 | 60 |
| 110 | 120 | 2.08 | 0.43 | 55 |

From the above table, it appears that a granular brown sugar dried to around ½% moisture has a moisture resistance of around 50 to 60 minutes.

A screen analysis of such a product which, when screened through a No. 10 Tyler mesh screen, had a moisture resistance of about 55 minutes, showed that the fraction passing through a 14 mesh screen and on a 20 mesh screen had a moisture resistance of 65 minutes; the fraction passing through a 20 mesh screen and on a 28 mesh screen had a moisture resistance of 60 minutes; the fraction passing through a 28 mesh screen and on a 35 mesh screen had a moisture resistance of 50 minutes, and the fraction passing through a 35 mesh screen and on a 48 mesh screen had a moisture resistance of 30 minutes. Only a relatively small amount of the fine product passing through a 35 mesh screen was present. Such fine, as well as coarse, material can readily be removed by screening, not only to remove over-size, e.g., with a 10 mesh Tyler screen, but by removing finer particles, e.g. such as will pass through a 35 or 48 mesh screen.

The carrying out of the process on a plant scale can advantageously be accomplished in such an apparatus as that illustrated conventionally in the accompanying drawing. In the apparatus illustrated, a feeding device in the form of a mixer 1 feeds the granular brown sugar through the conduit 2 to the upper end of a rotary dryer such as the Hersey granulator 3. From the lower end of the dryer, the sugar passes through the conduit 4 to the upper inlet end of a second rotary drum such as a Hersey granulator 5, which serves as a cooler and for further drying the granular sugar. From the lower discharge end of the cooler 5 the dried and cooled granular brown sugar passes through the spout 6 and over a 10 mesh Tyler screen (not shown) to remove over-size granules, and the screened product is then passed to a storage bin or receptacle 7, from which the dry material can be passed to packaging equipment or to a pulverizer, where the dried, granular brown sugar is to be pulverized to make a finely divided pulverulent product.

At the lower outlet end of the dryer 3, provision is made for introducing hot air, the air being preheated, e.g., to around 275° F., by passing over steam heated coils 11. From the upper end of the dryer, air is discharged through the outlet pipe 12, and circulation of air is effected by the blower 13.

The lower Hersey granulator or cooler has provision for the introduction of cool air, e.g., at around 80° F., at 14, and the air is discharged from the cooler through the outlet 15, with circulation effected by the fan 16.

In such an apparatus, the granular brown sugar, with its normal water content, is introduced and dried by the hot air while it is being agitated and kept in granular form and subjected to the rubbing and compacting action during drying. The hot, dried sugar is discharged from the lower end of the dryer to the upper end of the cooling drum, where it is kept in agitation and subjected to the action of cool air to cool the dried sugar and to accomplish some further drying if the sugar has not been sufficiently dried in the dryer section.

The product discharged from the cooler is a dried and cooled granular product with its original molasses coating converted into a solid, non-tacky layer or film, and a product which is ready, after screening, to remove oversize granules, and, if desired, fine particles, to be sent to packaging apparatus, or to be sent to a pulverizer where the product is to be pulverized to form a pulverulent brown sugar product, as described, e.g., in my application Serial No. 550,534, filed December 2, 1955.

In carrying out the process in an apparatus such as that above described, with a feed of one 100-pound bag of brown sugar every 90 seconds into the mixer, or a rate of about 4,000 pounds of brown sugar per hour, and with the air supplied to the upper granulator at a temperature of 275-320° F., and discharged from the cooling granulator at a temperature of 80°-90° F., a product was obtained which, after screening through a 10 mesh Tyler screen, had a moisture content of 0.45% and a resistance to moisture by the above test of 135 minutes.

It is one advantage of the present process that brown sugar with its normal moisture and molasses content can advantageously be treated and dried without any added coating material whatever, so that the dried product is of substantially the same composition as the original brown sugar except for the reduction in moisture content and the difference in physical structure and arrangement and make-up of the granules or agglomerates.

The product produced by the process with a preliminary screening to remove over-size particles, e.g., through a 10 or 14 mesh screen, and in some cases with further screening to remove a small amount of fine material, e.g., through a 35 or 48 mesh screen, is a product having valuable keeping properties and resistance to moisture.

It is another advantage of the present invention that ordinary brown sugar can be converted, without any added coating material, into a dried, granular product having unusual caking resistance properties. The addition of small amounts of coating materials may not interfere with the process, and may give a somewhat modified dried product. Without any added coating material, the dried product has all the properties and advantages of brown sugar from the standpoint of taste and flavor, but is distinguished therefrom by its remarkable caking resistance properties.

The dried brown sugar product of the present invention can be marketed as a granular brown sugar with good keeping qualities. It can also be subjected to pulverizing to form a pulverulent brown sugar product, e.g., as described in my prior application Serial No. 550,534.

While the dried granular brown sugar product of the present invention has greatly increased resistance to caking, it is readily soluble in water and has the desirable and characteristic taste and flavor of brown sugar, with its original molasses layer converted into a dry, solid, hard, non-tacky coating.

I claim:

1. The method of converting moist granular brown sugar having a sticky molasses layer on the sugar crystals into a free-flowing, dry, granular brown sugar product resistant to caking, which comprises drying brown sugar at a temperature above about 60° C. (140° F.) and with agitation to maintain the brown sugar in a granular state by rubbing the granules against each other during drying, and continuing the drying with agitation until the moisture content is less than 1% and the molasses layer is converted into a dry, solid, non-sticky form, and cooling the resulting product with agitation to a temperature below about 90° F. (32° C.)

2. The method of converting moist granular brown sugar having a sticky molasses layer on the sugar crystals into a free-flowing, dry, granular sugar product resistant to caking, which comprises drying the brown sugar at a temperature above about 60° C. (140° F.) and with agitation during the drying to reduce the moisture content to below 1% and to convert the molasses of said brown sugar to a dry, solid, non-sticky form, and cooling the resulting product, with agitation to a temperature below about 90° F.

3. A dry, granular brown sugar product resulting from the drying at high temperatures of brown sugar and having a molasses coating thereon in a dry, solid, non-sticky form, said dry product containing a fraction of a percent of moisture and being a free-flowing, granular brown sugar product with rounded aggregates having small particles of sugar adhering to the dried molasses coating and having a resistance to caking, of more than about 30 minutes, as determined by the following test: A 10-gram sample of the dried product is placed in an open aluminum dish at a temperature of 85° F. and a relative humidity of 70% and the aluminum dish is slightly tilted back and forth during the test until the product starts to lose its free-flowing characteristics and the period of time is recorded as the time of resistance to caking.

References Cited in the file of this patent

UNITED STATES PATENTS

| | | |
|---|---|---|
| 162,245 | Matthiessen | Apr. 20, 1875 |
| 2,033,416 | Daley | Mar. 10, 1936 |
| 2,400,292 | Dalton | May 14, 1946 |

OTHER REFERENCES

Beet Sugar Technology, by R. A. McGinnis, 1951, New York, N.Y., pp. 388 and 414–416.